(Model.)
E. S. HUTCHINSON.
WATER CLOSET.
No. 249,767. Patented Nov. 22, 1881.
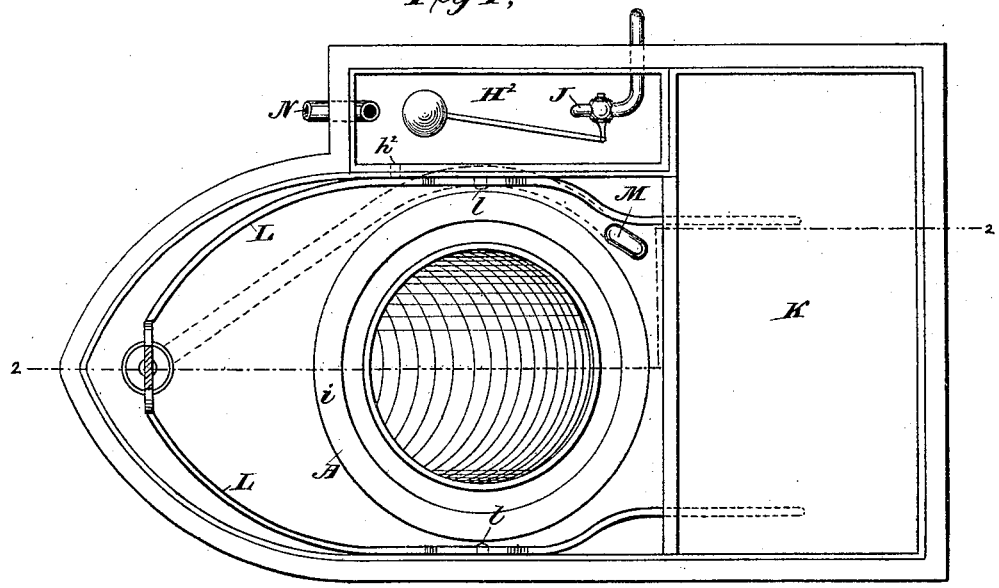
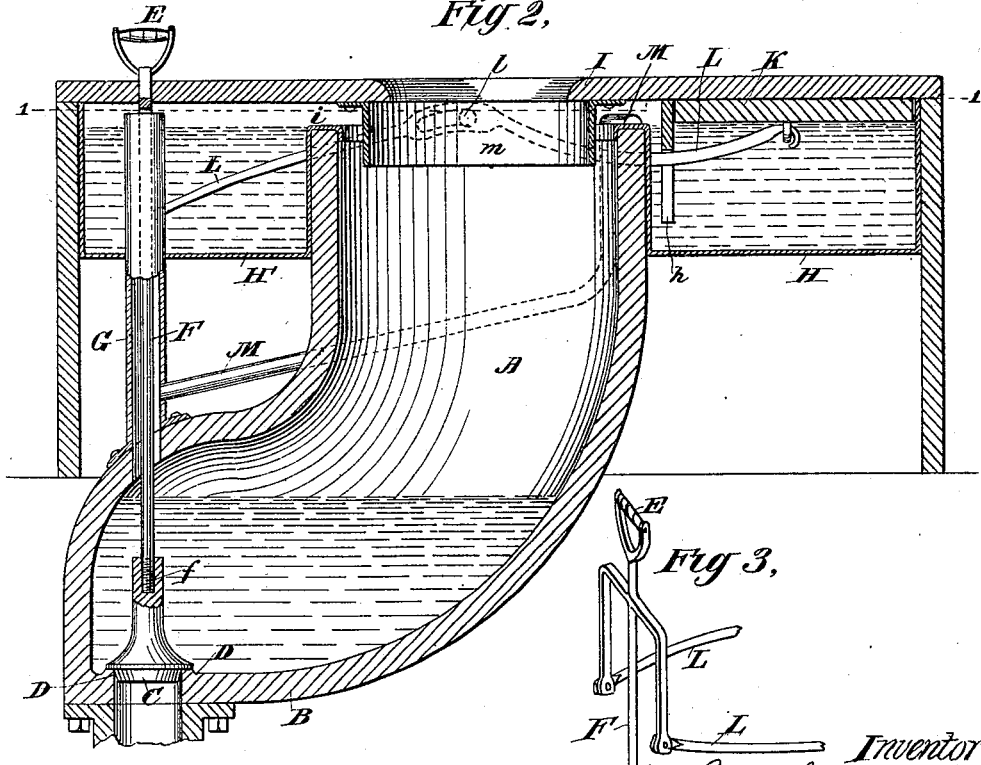
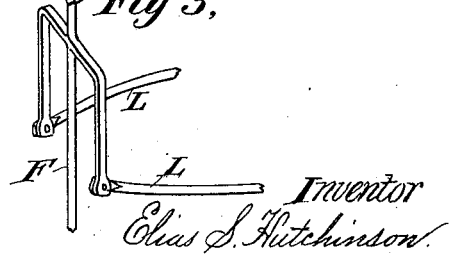
Attest
Geo. T. Smallwood Jr.
Harry E. Knight
Inventor
Elias S. Hutchinson.
By Knight Bros
Attys.

UNITED STATES PATENT OFFICE.

ELIAS S. HUTCHINSON, OF WASHINGTON, DISTRICT OF COLUMBIA.

WATER-CLOSET.

SPECIFICATION forming part of Letters Patent No. 249,767, dated November 22, 1881.

Application filed February 9, 1881. (Model.)

*To all whom it may concern:*

Be it known that I, ELIAS S. HUTCHINSON, a citizen of the United States, residing at Washington, in the District of Columbia, have invented Improvements in Water-Closets, of which the following is a specification.

My improved closet is constructed with a tight discharge-valve, and with no overflow-connection with the sewer. For washing the bowl when the discharge-valve is opened I employ a flushing-tank, preferably placed beneath the seat, and adapted to contain a body of water at a higher level than that in the bowl, and having its own overflow independent of the bowl and of the soil-pipe or sewer, so that no communication is had with the sewer excepting at the moment of discharging the bowl, at which time a copious flush of water is descending through the valve. The flushing of the bowl is effected by expelling water from the tank, with the opening of the discharge-valve, by a displacement plate or piston, operated, as hereinafter described, simultaneously with the opening of the discharge-valve.

The invention further relates to a siphon attachment, which, being charged and started in operation by the raising of the water by the action of the displacement plate or piston, and continuing in operation after the discharge-valve is closed, supplies to the bowl a new charge of water in readiness for the next occasion.

In order that the invention may be fully understood, I will proceed to describe it with reference to the accompanying drawings, making part of this specification, in which—

Figure 1 is a plan view of a water-closet illustrating the invention, partly in horizontal section on the line 1 1, Fig. 2. Fig. 2 is a vertical section on the line 2 2, Fig. 1. Fig. 3 is a detached perspective view of parts of the valve-rod and piston-levers, hereinafter described.

The bowl A converges downward, as shown, terminating in a horizontal recess, B, in which the discharge-valve C works upon a seat, D, forming an annular ridge of slight elevation. The valve is operated by a pull-rod, F, passing up through a guide pipe or cylinder, G, and furnished with a customary handle, E, and with a suitable collar or lugs for the attachment of levers for operating the piston, presently to be described, for ejecting flushing-water from the tank. The pull-rod is attached to the valve C by a screw or other detachable connection, $f$, adapting the parts to be separated and removed by a workman passing his hand down through the bowl and grasping the neck of the valve.

The flushing tank or reservoir is located under the seat, and made in two parts, H H', separated by a partition, $h$. The main tank, H, is preferably placed on one side of the bowl A. The chamber H' is of more contracted area, and is conformed to the sides of the bowl A, and connected therewith by a curved flange, $i$, extending over the margin of the bowl, and serving to conduct into it the water, which is caused to overflow the chamber H'. The partition $h$ extends from the top of the tank nearly to its bottom, leaving a space through which water may pass between the tank H and chamber H'.

In the tank H is fitted a flat plate, K, constituting a piston, and provided, if desired, with a lip of rubber extending around its margin more tightly within. The piston-plate K is operated by levers L L, fulcrumed at $l\ l$, and each connected at its respective end to the valve-rod F, and at the other to the plate K, so that when the rod F is pulled up to open the discharge-valve the plate or piston K will be forced down nearly or quite to the bottom of the tank H, ejecting the water from the tank H through the chamber H', and causing it to overflow into the bowl A in ample volume to flush and cleanse the same. The levers L L work in narrow vertical slots in the partition $h$.

The flushing-tank is supplied from the service-pipe by means of a common ball-cock, J, located in a supplemental reservoir, $H^2$, which is connected with the chamber H' of the flushing-tank through a small opening, $h^2$, near the bottom, the capacity of which may be amply sufficient to fill the tank H between the times of using without being sufficient to permit the water-level in the reservoir $H^2$ to be materially raised by the instantaneous flush forced through the chamber H' by the descent of the plate K.

An annular shield, $m$, attached to the seat I projects downward within the bowl, serving to conceal the margin of the bowl and to deflect the water downward.

M represents a siphon, having its receiving end within the chamber H', at or near the level of the bottom thereof, and its descending leg carried through the bottom of the said chamber and around the outside of the bowl to the pipe G, through which it discharges into the bowl below; or, if preferred, the said siphon may be simply carried over the margin of the bowl and extended a sufficient distance downward within the same. The bend of the siphon is slightly above the ordinary water-level in the chamber H', so that when the water is raised by the descent of the displacement plate or piston K the siphon will be charged and started in operation, in order to complete the emptying of the chamber H' and tank H into the bowl, the capacity of the siphon being greater than that of the supply-cock J or port $h^2$.

An overflow-pipe, N, located at the required level within the reservoir $H^2$ discharges surplus water through any suitable outlet, which need not be trapped, as none but pure water can ever pass off through the said pipe, and it is not connected with the soil-pipe.

The operation is as follows: On raising the valve C the fouled water and fecal matter instantly descend to the soil-pipe, or to the customary trap, if a trap be used, and the tank-water displaced by the descent of the piston K, flowing over the margin of the bowl A, flushes and cleanses the bowl and passes down through the discharge-valve, carrying the foul water completely through and beyond the trap, if there be a trap, and leaving it full of pure water. The valve C being then closed, the siphon M, having been charged or filled by the elevation of water in the chamber H', will continue to flow until it empties the tank H H'. The siphon thus supplies a third body of water to recharge the bowl B, in readiness for the next occasion, and after the siphon becomes empty and ceases to flow the chamber H' and tank H are gradually filled up again through the cock J.

The flushing-tank and displacement-float are applicable to a simple hopper-closet, in which case the horizontal recess B and the discharge-valve C would be dispensed with and the displacement plate or piston K operated either by the pull-rod F and lever L, as before, or by any other simple mechanical connection.

My improved water-closet combines the following advantages in a marked degree: All the foul water is carried immediately and completely through and beyond the trap in the soil-pipe, if a trap be used. The discharge-valve C completely closes the soil-pipe, and the water standing over it seals the same, and as there is no other opening into the soil-pipe, either for overflow or otherwise, any escape of sewer-gas is impossible, and the necessity for any trap is thus avoided. The overflow cannot possibly become contaminated so as to be offensive or produce any injurious effect. The flushing and cleansing of the bowl or hopper are effected without any direct connection with the general water-service of the house.

In other applications I have described flushing-tanks beneath the seat from which the water is discharged, in one case by a valve of large capacity operated by a lever, and in the other case by the forcing of air into a closed space over the surface of the water.

Having thus described my invention, the following is what I claim as new therein and desire to secure by Letters Patent:

1. The combination of the bowl or hopper A, flushing-tank H, the loose displacement-plate K, the valve-rod F, and connections L for pulling the displacement-plate down within the tank H on the raising of the valve, substantially as herein described.

2. The combination of the tank H, displacement plate or piston K, and siphon M, operating substantially as and for the purpose set forth.

3. The combination of a bowl having a tight discharge-valve and no overflow-connection with the sewer and a flushing-tank on a higher level, having its own overflow independent of the bowl and of the soil-pipe or sewer, substantially as set forth.

4. A water-closet constructed with a tight discharge-valve and with a flushing-tank under the seat, having an overflow independent of the bowl and of the sewer, substantially as set forth.

ELIAS S. HUTCHINSON.

Witnesses:
OCTAVIUS KNIGHT,
WALTER ALLEN.